United States Patent Office 3,056,211
Patented Oct. 2, 1962

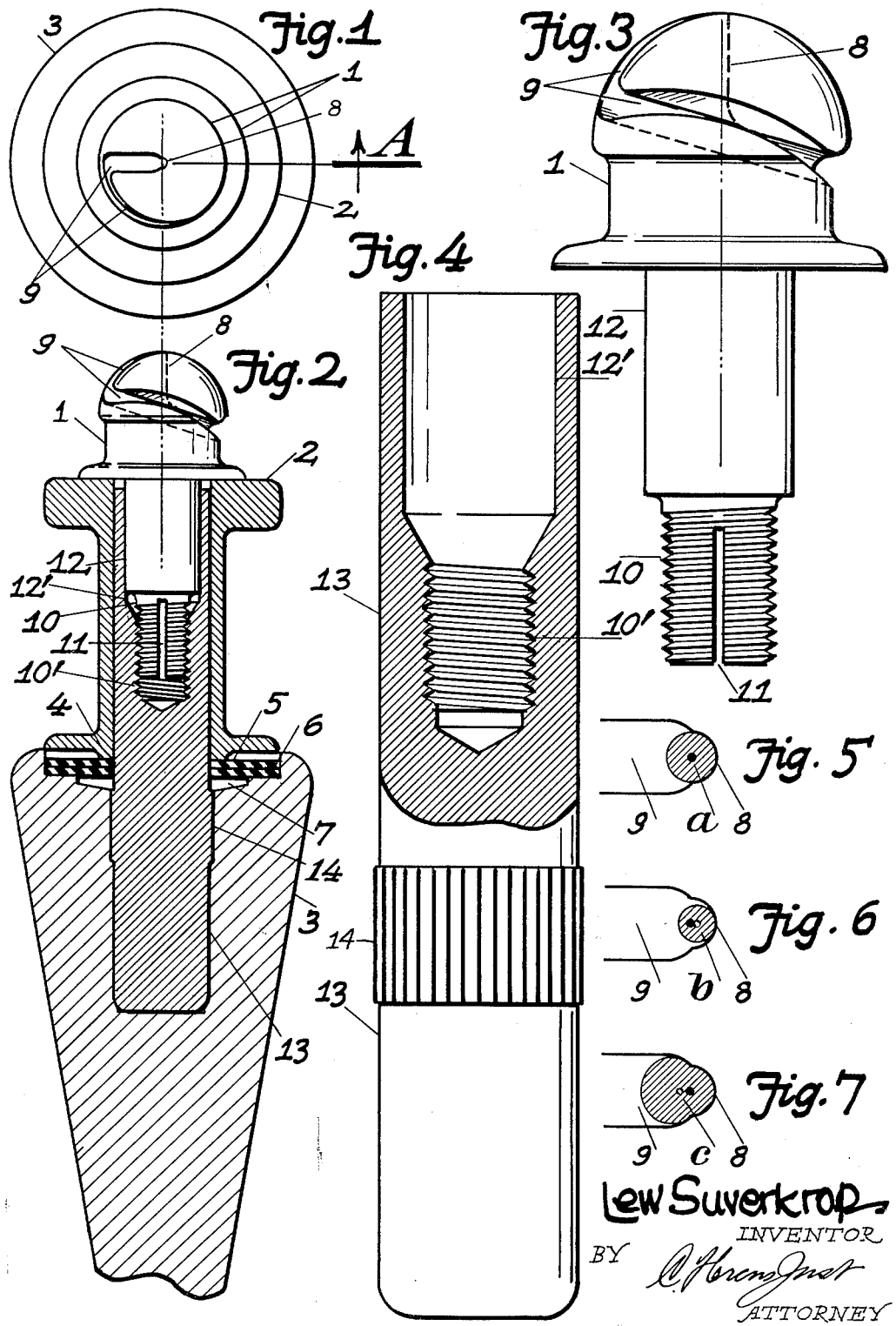

3,056,211
ADJUSTABLE PLUMB BOBS
Lew Suverkrop, Box 436, Bakersfield, Calif.
Filed May 26, 1958, Ser. No. 737,961
6 Claims. (Cl. 33—216)

This invention is an improvement in the adjustable plumb bob covered by my Patent 2,469,583, dated May 10, 1949, whose objectives were mainly quickness and convenience in use. Apart from objectives listed in that patent, the type of plumb bob thereof has a theoretical advantage of superior accuracy of a plumb line indicated by it, when compared with ordinary plumb bobs in which the cord issues from an encircling cord hole. The reason for this is that, to make practicable the stringing of such an ordinary bob, the cord hole must be of diameter appreciably larger than that of the thickest cord which may ever be required in work with the bob. Therefore, even the thickest usable cord may bear against one side of the cord hole; and then we have the curious condition of a "plumb" bob that does not hang plumb. And with the more commonly used, smaller diameter cord this eccentricity is increased. Precise measurements made by me (on a large number of such ordinary bobs made by numerous manufacturers including myself) show eccentricity, largely of this kind, occasionally exceeding 1/32(=0.031) inch. The importance of this is suggested by the current Federal plumb bob specification GGG-P-501-c which limits suspended eccentricity to 1/28(=0.008) inch, which is less than one-fourth actual eccentricities observed. But the type of bob in Patent 2,469,583 whose improvement is covered by this present specification has inherent features which tend to obviate these difficulties. In this type the position of the cord issuing from the bob is not loosely bounded and inaccurately determined by a hole of diameter always larger than any cord with which it may be used. Instead, whatever the diameter of the cord, its position is invariably determined by a cord seat, against which it always bears firmly when the bob is in use. Access to the cord seat is a separate function provided by slots at the side which, when made as shown by Patent 2,469,583 of width equal to the diameter of the cord seat, actually permit use of cord slightly thicker than the cord seat diameter. Thus there is nothing to preclude making the cord seat diameter equal to that of any cord desired. Naturally, when cord of that particular diameter is used it will invariably take a position precisely concentric with the cord seat. And it can be shown mathematically that cords in a range considerably thicker or thinner than this diameter will take positions averaging less eccentric than may be the case when used with the required cord hole diameter of an ordinary plumb bob. The reference here is that of the cord axis to, respectively, cord seat and cord hole. Although based on actual observations and valid calculations, so much is theory as regards the bob covered by Patent 2,469,583; and for this reason that patent did not list such accuracy among its objectives. This is to say, if this present type of bob there shown be made of precisely homogeneous material, if this be formed into precisely concentric parts, if these be assembled precisely concentric, and if during use the bob is kept from damage, then what has been said regarding concentricity of the cord with cord seat or cord hole will also apply respecting concentricity of the cord with the axis of the bob. In brief, under those specific conditions, the inherent features of such a plumb bob will make it in performance more accurate than any plumb bob of the ordinary kind.

But those specific conditions are impractical. They are made so by the nature of commercially available materials, by tolerances required for economic manufacture, and by the rough use such plumb bobs ordinarily suffer in the field. All such operate against achieving invariably and reliably, over any length of time commercially worth considering, the advantages in accuracy theoretically inherent in this type of plumb bob brought to the state of development shown and described in Patent 2,469,583. This, together with what follows later in this present specification, will be made plain by a brief discussion of findings from field experience with, research in, and manufacture of that plumb bob. It will be helpful in considering this to refer to that patent.

A number of considerations (and particularly those having to do with balance of the finished bob) impose restrictions on the over-all size of the reel with which the bob may be equipped. At the same time, a considerable cord capacity is desirable, especially in trades that use this type of bob most. With over-all size limited, the only way to increase capacity would be to reduce the minor diameter of the reel. But this is confronted by diameter requirements of the stem upon which the reel rotates, including that of strength to resist bending during service use. Traditionally—probably more than for any other reason—bodies of plumb bobs of these types are always made of brass. This tradition alone is so strong a factor as to require manufacturers to follow that practice. Intricacy of the bob-top (in which the semi-cylindrical seat and intersecting slots are fashioned) is such that this part can be economically manufactured only from some easily-worked material such as brass; and the choice of brass here is further supported by considerations of appearance. Therefore, considerations of accuracy such as have been discussed above, or any other reason requiring that the stem be made integral with either the body or the bob-top as shown in the previous patent, lead unavoidably to the stem being of brass. And the limited strength of this material requires a larger diameter, if the bob is to withstand field use and abuse, than would a material of greater unit strength. Proceeding from these facts effort was made to devise a steel stem and a method of fixing it permanently in the brass body that would meet requirements of manufacturing economy as well as accuracy.

Now, even with a relatively soft brass stem, difficulty had been experienced in assembling concentrically into it the split threaded stem of the bob-top of the previous patent. Occasionally the bob-top threads did not engage properly with those of the stem, resulting in eccentricity. With a steel stem it was found that the difficulty of assembling that bob-top was worsened. Despite painstaking and costly care in the assembly, the harder threads of the steel stem instead of properly engaging the softer brass threads of that bob-top frequently destroyed them and cut new ones in a way that caused the bob-top to cock at a considerable angle to the stem. Besides taking excessive costly time, the bob-top—an expensive part to manufacture—frequently was damaged beyond use or repair. This led to inventing the new form of bob-top, presented in this present specification, which eliminates the difficulty.

In summary, the practical objectives achieved by this present invention include (1) increased accuracy in indication of plumb; (2) improved resistance to damage in use; (3) reduced manufacturing cost; and (4) assurance that, if necessary to assemble the bob in the field, this may be properly and readily accomplished without unusual tools. These together with other objectives of this invention will be clear from the following description and the accompanying illustrations in which FIG. 1 is a plan of an improved plumb bob made according to this specification;

FIG. 2 is a cross-section along the line A in FIG. 1, showing the assembly of this improved plumb bob;

FIG. 3 is an enlarged view of the improved bob-top made according to this specification;

FIG. 4 is a view, partly in section, of the plumb bob stem covered by this specification; and FIGS. 5, 6, and 7 are diagrams illustrative of how, in plumb bobs constructed according to this specification, cord of different diameters is centered close to the plumb bob axis.

The improved plum bob shown in FIGS. 1 and 2 has the bob-cap 1, the rotatable exterior reel 2, and the body 3. The lower, apex end (not shown) of body 3 is preferably fitted with a common standard replaceable steel plumb bob point. The types of plumb bobs generally, of which the present is one, are traditionally supplied with bodies of brass; and for this reason or for economy in manufacture it is preferable that bob-cap 1, reel 2, and body 3 be made of this material.

The lower flange of reel 2 has a raised annular ridge 4 immediately adjacent to the bore of reel 2. Ridge 4 bears against the inner diameter of spring washers 5. These are preferably two in number, with the upper one of fiber or the like, and the lower one of thin spring metal. At their outer diameters washers 5 bear against the ridge 6 which is sufficiently elevated above the central part of cavity 7 formed in body 3 so as not to restrict flexing of washers 5 but allow considerable spring adjustment in them as may be required for regulation of friction control of reel 2. The upper part of bob-top 1 has a semi-cylindrical cord seat 8 and intersecting slots 9. These are shown in my previous patent but with this improvement: As shown in FIG. 1 and indicated more clearly in the diagrams of FIGS. 5, 6, and 7, cord seat 8 is given a reduced diameter chosen as the average cord diameter or the diameter of the cord with which great accuracy is desired, while access slots 9 are wider than that diameter, being sufficiently wide to admit freely, to cord seat 8, a cord chosen as the thickest cord with which the bob may be used. This makes it possible to use thicker cord than can be used in ordinary plumb bobs. Moreover, by proper choice of width of access slots and diameter of cord seat, a bob top according to this specification can be made to give both (a) high accuracy with cord of average diameter, and (b) higher average accuracy than either an ordinary plumb bob bob-top, or even one made according to the previous patent. This is made clear from the accompanying table which compares possible eccentricity of cord in three bob tops described at the foot of the table. In considering the table it should be kept in mind that the figures given are quite apart from eccentricity due to lack of symmetry, etc. in the bob parts and assembly.

*Comparison Between Bob-Tops of Different Types Showing Difference in Possible Cord Eccentricity*

| Kind of Cord Used | Eccentricity Possible When Using Bob-Top of— | | |
|---|---|---|---|
| | Type A [1] | Type B [1] | Type C [1] |
| | Inches | Inches | Inches |
| Thin cord 0.012″ dia | 0.032 | 0.026 | 0.018 |
| Average cord 0.048″ dia | 0.014 | 0.008 | 0.000 |
| Thick cord 0.064″ dia | 0.006 | 0.000 | 0.008 |
| Over-all Performance; average of figures above | more than 0.017 | more than 0.011 | less than 0.009 |
| Thickest cord dia. usable | 0.064 | 0.074 | 0.086 |
| Eccentricity when used | 0.006 | 0.005 | 0.020 |

[1] Type A=bob-top of ordinary bob; diameter of cord hole, 0.076″ diameter (a commonly specified size); Type B=bob-top according to Patent 2,469,583 with access slots 0.064″ wide and cord seat 0.064″ as made in the past; Type C=bob-top of bob according to this specification with access slots chosen at 0.076″ wide and cord seat 0.048″ diameter which diameter has been found to be close to the average diameter of plumb bob cords used with these types of bobs.

The reason for the superior accuracy of the bob-top of this present specification, presented by the figures in the table, is illustrated by the diagrams of FIGS. 5, 6, and 7. In each of these, the widened access slot is indicated at 9, and the cord seat 8 is given the same diameter as that of an average cord used with these types of plumb bobs. In FIG. 5 the cord $a$ and cord seat 8 are of the same diameter so that cord and cord seat coincide; there is no eccentricity. In FIG. 6 a thin cord centers only slightly to one side of the axis of the cord seat 8. In FIG. 7 a thick cord $c$ fills the cords seat and centers outside of it.

It will be noted that this bob-top gives least eccentricity when used with cords ranging in diameter from average to thin. This is as it should be, for invariably thick cord is used when eccentricity is least important. As a matter of fact, plumb bob users' actual needs for accuracy would be better reflected if the table indicated, rather than "over-all performance," the average eccentricity for only cords of average and thinner diameters. This is the average of the first two instead of the first three lines of the table. That can readily be done; and the figures are 0.023, 0.017 and 0.009 inch, respectively, for the three types of bob-top shown in the table. The table shows that the present bob-top permits use of a thicker cord than either of the others. As explained above, the greater eccentricity with such larger cord is of minor importance since precision is most wanted when thin cord is used. It is significant that the bob-top of the ordinary bob may give the least accuracy when used with the finest cord, commonly wanted in accurate work. The bob-top of the previous patent performs better, with 0.006 inch less eccentricity; while the eccentricity is 0.024 inch less in the present bob-top, three times the improvement of the bob-top of the previous patent. The figures are given in the first data line of the table. It is interesting to compare all the figures in the table and in the foregoing discussion with the 0.008 inch eccentricity limit of the Federal plumb bob specification GGG-P-501-c, mentioned earlier in this specification.

The lower end of bob-top 1 is provided with a stem having threads 10 which engage with the threads 10′ of the stem 13. This is split at 11 and spread apart, providing friction engagement in the threads 10 and 10′ to prevent accidental turning of bob-top 1 in the stem 13. The remainder of the stem of bob-top 1 is preferably of larger diameter than the major diameter of threads 10; and this part, 12, is given a suitable fit in the upper part 12′ of the hole in the stem 13 so as to guide and hold the bob-top with its axis coincident with that of the stem 13. When parts 12 and 12′ are cylinders, with a rather close sliding fit and a proper length, assembly is accomplished by placing the bob-top 1 in the stem 13 until threads 10 strike threads 10′, at which point pressing and turning the bob-top 1 will cause the threads to engage properly.

Stem 13 has a diameter which is a sliding fit in a hole prepared for it in body 3, except that part of the stem surface is raised by knurling 14. This part of the stem 13 is larger than the hole. Pressing stem 13 into place causes interference of the knurling 14 with the metal of the body 3, resulting in stem 13 becoming a permanent part of the body 3. The hole in body 3 may be prepared by drilling with a flat-bottom drill, and then reaming. The bottom edge of stem 13 may be given a rounded or other form of chamfer which will engage by interference with the metal left by the reamer at the corner of the hole. By properly choosing the shape of the chamfer and of the sharpened ends of the reamer blades, the correct amount of interference will be provided. This will not be sufficient to cause irregularity in the final stopping place of the stem 13 in body 3 but will permit it, by displacement of metal at the bottom of the hole, to seat on the bottom of the hole. At the same time, the interference will be sufficient to insure desired alignment between stem 13 and body 3.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A plumb bob comprising in combination a body having a central axis arranged to be suspended vertically during use, a flanged reel mounted on the upper end of said body for rotation around said central axis of said body, a bob-top mounted above the upper flange of said reel and disposed inward from the periphery thereof, said bob-top including a semi-cylindrical cord seat whose axis is centered on said central axis and is centrally of the end of a passageway extending radially outward therefrom and of greater width than the diameter of said cord seat to receive a cord from the periphery of the upper flange of said reel and dispose said cord so that it bears against and is guided by said cord seat and extends upward from said bob-top in alignment with said central axis, whereby the upper flange of said reel may be manually engaged to rotate said reel in opposite directions to raise or lower said plumb bob when suspended on said cord, adjustable friction means to retard rotation of said reel relative to said body, means for adjusting the amount of friction due to said friction means comprising threads on said bob top engaged with threads in said body, substantially cylindrical means separate from said threads to guide linear motion of said bob-top with respect to said body and maintain the axis of said bob top coincident with the axis of said body, and means to prevent accidental alteration of adjustment made in said friction means.

2. An axle for the reel of an adjustable plumb bob made separate from the body of the plumb bob, means for attaching it to said body, a hole in the outboard end of the axle, threads in the lower part of said hole concentric with the axle, and a plain cylindrical surface in the upper part of said hole similarly concentric, with threads and cylindrical surface respectively adapted to receive and mate with threads and a cylindrical surface on a bob-top for such plumb bob.

3. An axle for the reel of an adjustable plumb bob according to claim 2 in which the means for attaching it to the body is an integral extension from the axle with means to effect permanent attachment to the body by forcing it into a suitably prepared hole in the body.

4. An axle for the reel of an adjustable plumb bob according to claim 3 in which the means for effecting permanent attachment to the body consists of said extension being first of cylindrical form with diameter slightly less than said hole, a surface of diameter greater than said hole raised by knurling part of this extension at a place thereon which will come within the mouth of said hole when the extension is in place therein, a chamfer where the cylindrical surface of the extension meets the end thereof, and an angular corner in the bottom of said hole leaving material of the body at this place which will displace or be displaced by the material of said extension at said chamfer when the extension is forced to seat in the bottom of said hole.

5. A plumb bob according to claim 1 in which the reel thereof rotates on an axle according to claim 2.

6. A plumb bob comprising in combination a body and a bob top on the upper end thereof, said top having a slot through which cord of a predetermined range of diameters may be passed and from which cord said bob may be suspended, said slot terminating in a cord seat precisely coaxial with the body of the bob and substantially semi-cylindrical in cross-section and of smaller diameter than the width of and substantially central of the end of said slot, whereby a substantial range of diameters of cords can be accommodated within said seat and be disposed within a high degree of concentricity with the axis of the body of said bob.

References Cited in the file of this patent

UNITED STATES PATENTS

| | | |
|---|---|---|
| 1,177,299 | Borden | Mar. 28, 1916 |
| 1,502,804 | Windham | July 29, 1924 |
| 2,469,583 | Suverkrop | May 10, 1949 |